United States Patent [19]

Haderer

[11] Patent Number: 6,008,607
[45] Date of Patent: Dec. 28, 1999

[54] DEVICE AND PROCESS FOR ELECTRONIC MONITORING OF AN ADJUSTMENT DRIVE IN A VEHICLE

[75] Inventor: Guenter Haderer, Buehl, Germany

[73] Assignee: Robert Bosch GmbH, Stuttgart, Germany

[21] Appl. No.: 08/952,345

[22] PCT Filed: Jan. 28, 1997

[86] PCT No.: PCT/DE97/00140

§ 371 Date: Nov. 18, 1997

§ 102(e) Date: Nov. 18, 1997

[87] PCT Pub. No.: WO97/35736

PCT Pub. Date: Oct. 2, 1997

[30] Foreign Application Priority Data

Mar. 23, 1996 [DE] Germany .................... 196 11 535

[51] Int. Cl.$^6$ .................................................. G05B 5/00
[52] U.S. Cl. ........................................ 318/446; 318/452
[58] Field of Search .................................. 318/443–489, 318/280–300

[56] References Cited

U.S. PATENT DOCUMENTS

| 4,852,469 | 8/1989 | Chuang | 236/49.3 |
| 5,054,686 | 10/1991 | Chuang | 236/49.3 |
| 5,413,528 | 5/1995 | Pabst et al. | 454/70 |
| 5,453,671 | 9/1995 | Baier et al. | 318/466 |
| 5,640,072 | 6/1997 | Miyazaki et al. | 318/282 |

*Primary Examiner*—David Martin
*Attorney, Agent, or Firm*—Venable; George H. Spencer; Norman N. Kunitz

[57] ABSTRACT

Suggested are a device and a method for electronically monitoring an adjustment drive arranged in a vehicle, for which a second adjustment drive (17) is actuated by an electronic control unit (12) in dependence on a first adjustment drive (15) in order to ventilate the vehicle inside space. This reduces the risk of a faulty actuation of the closing force limitation as a result of pressure changes.

16 Claims, 1 Drawing Sheet

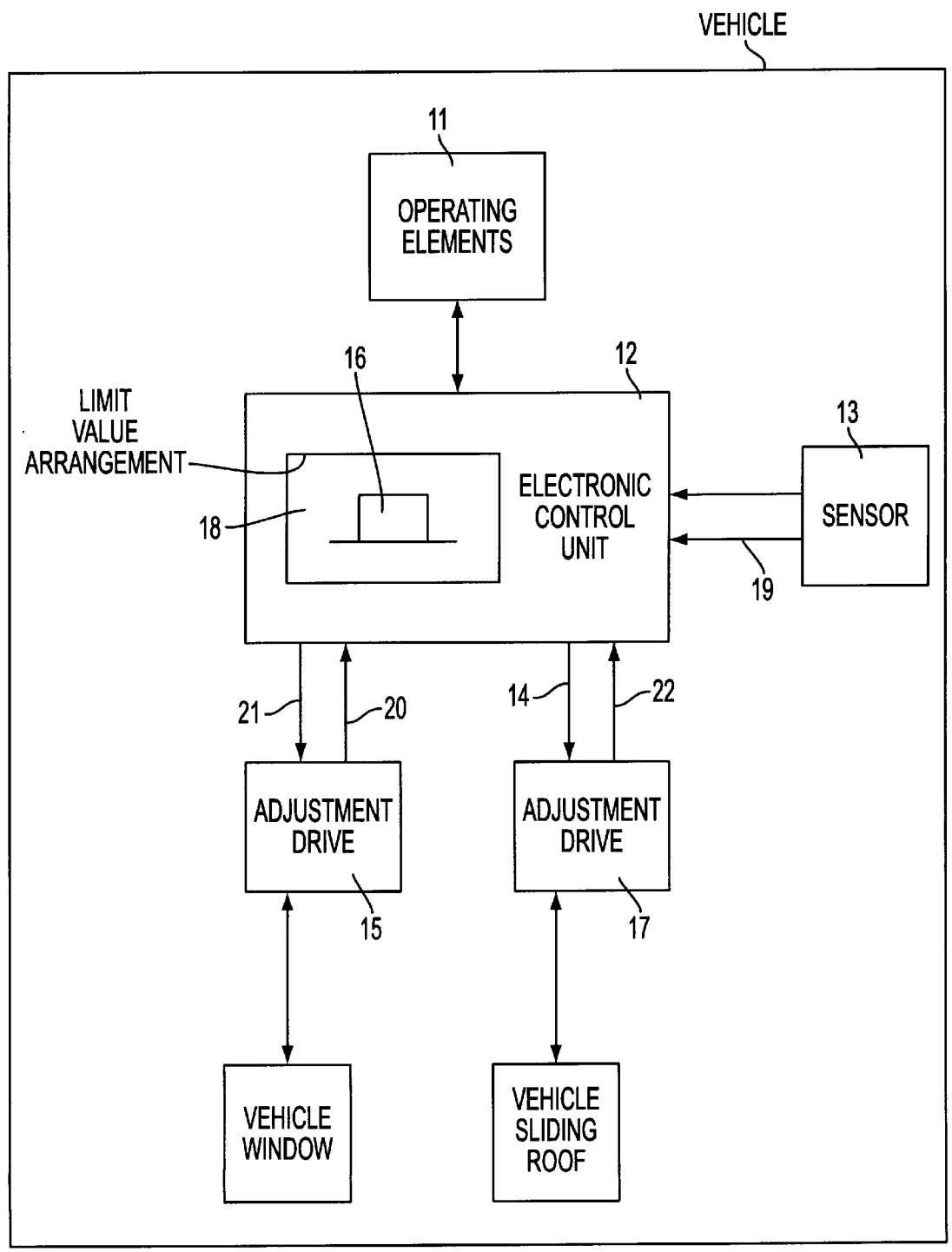

DEVICE AND PROCESS FOR ELECTRONIC MONITORING OF AN ADJUSTMENT DRIVE IN A VEHICLE

STATE OF THE TECHNOLOGY

The invention is based on a device and a method for electronically monitoring an adjustment drive mounted in a vehicle. A method for electronically monitoring and controlling the opening and closing operation of electrically-operated units is known from DE-A 40,20,351, which method is designed to detect accelerating forces, in particular in a vertical direction, with the aid of an additionally installed sensor.

SUMMARY AND ADVANTAGES OF THE INVENTION

The device according to the invention and the method according to the invention for electronically monitoring an adjustment drive mounted in a vehicle have the advantage of reducing the probability of a faulty actuation of the closing force limitation, based on a ventilation of the vehicle inside space, since the force and pressure ratios that depend on the speed are taken into account for this purpose. As a result of the ventilation of the vehicle inside space, a lower pressure builds up, for example, at the sliding roof than would be the case without the ventilation. Consequently, faulty actuations can be reduced, especially at high vehicle speeds.

Advantageous modifications and embodiments are possible with the measures respectively listed in the dependent claims.

The device and the method are preferably used for a sliding roof, of the type secured by a closing force limitation, which is to be closed, and where the ventilation of the vehicle inside space is realized via window actuators or adjustment drives.

BRIEF DESCRIPTION OF THE DRAWING

The FIGURE shows an exemplary embodiment of a device according to the invention.

DETAILED DESCRIPTION OF THE PREFERRED EMBODIMENT

An electronic control unit 12 in the FIGURE comprises an arrangement 18 for making available a limit value for the closing force limitation, which arrangement generates a limit value 16 for the closing force limitation. A first adjustment drive 15 receives an adjustment signal 21, transmitted from the electronic control unit 12 to the first adjustment drive 15, and emits a position signal 20 of the position of the first adjustment drive 15. A second adjustment drive 17 receives an adjustment signal 14 and emits feedback signals. A sensor arrangement 13 transmits a tachometer signal 19 to the electronic control unit 12. The operating elements 11 are connected to the electronic control 12.

The arrangement shown in FIG. 1 operates as follows: The desired mode of operation, e.g., closing of the sliding roof, is transmitted via the operating elements 11 to the electronic control unit 12. Depending on the first adjustment drive 15 or the criteria described below, the adjustment drive 17 receives a command from the electronic control unit 12 to activate a device for ventilating the interior space of the vehicle. The side windows, the sliding roof or a separate opening in the vehicle inside space, in particular, are suitable for ventilating the inside space. The activation of air intake flaps for the air conditioning system can also be considered.

It is possible to predetermine a position to be reached for the second adjustment drive 17 from the side of the electronic control unit 12. The suggested embodiments ensure that the changes in pressure, e.g., resulting from the closing of the sliding roof, can be reduced rapidly thanks to the ventilation. The pressure changes reduced in this way result in a lower build-up of forces than would be the case without ventilation, thereby reducing the risk of a faulty actuation of the closing force limitation.

The moment for actuating the second adjustment drive 17 can be determined depending on various factors. The position signal 20 for the first adjustment drive 15 can be utilized by the electronic control unit 12, so that the second adjustment drive 17 is actuated only if the first adjustment drive 15 is within a predetermined range. This range, which permits the actuation of the second adjustment drive 17 can be selected freely. An actuation of the second adjustment drive 17 can also be realized in dependence on the moment when the operating elements 11 are activated. If, for example, the operating element 11 transmits a signal for closing the sliding roof to the electronic control unit 12, then the second adjustment drive 17 can be actuated for the purpose of ventilation either immediately or following a time delay. Also, the tachometer signal 19 could be used to actuate the second adjustment drive 17. Since high forces build up particularly at high speeds, e.g. at the sliding roof, the second adjustment drive must be actuated starting at a specific critical speed.

For one preferred use, the first adjustment drive 15 operates a sliding roof and the second adjustment drive 17 a window actuator or drive or vice versa.

I claim:

1. An arrangement for reducing pressure acting on a moveable element arranged in a vehicle during closing of the moveable element which is controlled by an adjustment drive, comprising:
   a first adjustment drive connected to a first moveable element for opening and closing said first moveable element and responsive to a closing force limit to secure the first moveable element;
   a second adjustment drive connected to a second moveable element for opening and closing the second moveable element, with said second moveable element being of the type which, when open, causes ventilation of the interior space of the vehicle;
   an operating element for providing a output signal causing actuation of said first adjustment drive; and
   electronic control means, responsive to the output signal from said operating element indicating closure of said first element, and to signals from said first and second adjustment drives, for actuating said second adjustment drive to open said second moveable element to reduce increased pressure acting on said first moveable element during movement of said vehicle.

2. An arrangement according to claim 1, wherein said control means causes actuation of the second adjustment drive in dependence on the position of the first adjustment drive (15).

3. An arrangement according to claim 1, wherein said control means causes the actuation of the second adjustment drive in dependence on an activation of the first moveable element.

4. An arrangement according to claim 1, wherein said control means causes the actuation of the second adjustment drive in dependence on the vehicle speed and the position of the first adjustment drive.

5. An arrangement according to claim 1, wherein the first moveable element is a sliding roof and the second moveable element is a vehicle window.

6. An arrangement according to claim 1, wherein the first moveable element is a vehicle window and the second moveable element is a sliding roof.

7. An arrangement according to claim 2, wherein the first moveable element is a sliding roof and the second moveable element is a vehicle window.

8. An arrangement according to claim 3, wherein the first moveable element is a sliding roof and the second moveable element is a vehicle window.

9. An arrangement according to claim 4, wherein the first moveable element is a sliding roof and the second moveable element is a vehicle window.

10. An arrangement according to claim 2, wherein the first moveable element is a vehicle window and the second moveable element is a sliding roof.

11. An arrangement according to claim 3, wherein the first moveable element is a vehicle window and the second moveable element is a sliding roof.

12. An arrangement according to claim 4, wherein the first moveable element is a vehicle window and the second moveable element is a sliding roof.

13. A method of reducing pressure acting on a moveable element arranged in a vehicle during closing of the moveable element which is controlled by an adjustment drive comprising the following steps:

providing a first adjustment drive connected to a first moveable element for opening and closing the first moveable element and responsive to a closing force limit to secure the first moveable element;

providing a second adjustment drive connected to a second moveable element for opening and closing the second moveable element, with said second moveable element being of the type which, when open, causes ventilation of the interior space of the vehicle;

in response to a control signal from a control element for causing closing of said first moveable element during movement of the vehicle, and in dependence on a signal from the first adjustment drive, actuating the second adjustment drive to reduce increased pressure acting on the first moveable element during closure thereof, and thereby reduce a risk of an erroneous detection of the closing force limitation.

14. A method according to claim 13, wherein the actuation of the second adjustment drive occurs in dependence on the position of the first adjustment drive.

15. A method according to claim 13, wherein the actuation of the second adjustment drive occurs in dependence on the point of time for activating the control elements.

16. A method according to claim 13 wherein the actuation of the second adjustment drive occurs in dependence on the vehicle speed and the first adjustment drive.

\* \* \* \* \*